US007954365B2

(12) United States Patent
White et al.

(10) Patent No.: US 7,954,365 B2
(45) Date of Patent: Jun. 7, 2011

(54) CLOSED LOOP CONTROL WITH BIAS VOLTAGE TOGGLE

(75) Inventors: Vincent A. White, Northville, MI (US); Michael S. Emmorey, Brighton, MI (US); Paul E. Treumuth, Rochester Hills, MI (US)

(73) Assignee: GM Global Technology Operations LLC

(*) Notice: Subject to any disclaimer, the term of this patent is extended or adjusted under 35 U.S.C. 154(b) by 132 days.

(21) Appl. No.: 12/434,949

(22) Filed: May 4, 2009

(65) Prior Publication Data

US 2010/0154525 A1 Jun. 24, 2010

Related U.S. Application Data

(60) Provisional application No. 61/140,263, filed on Dec. 23, 2008.

(51) Int. Cl.
*G01M 15/10* (2006.01)

(52) U.S. Cl. .................................................... 73/114.73

(58) Field of Classification Search ................ 73/114.73
See application file for complete search history.

(56) References Cited

U.S. PATENT DOCUMENTS

| | | | | |
|---|---|---|---|---|
| 4,332,225 | A * | 6/1982 | Cox et al. | 123/697 |
| 4,742,808 | A * | 5/1988 | Blumel et al. | 123/688 |
| 4,860,712 | A * | 8/1989 | Nakajima et al. | 123/697 |
| 4,873,642 | A * | 10/1989 | Mieno et al. | 701/109 |
| 5,291,417 | A * | 3/1994 | Schnaibel et al. | 700/300 |
| 5,392,643 | A * | 2/1995 | O'Kennedy et al. | 73/114.73 |
| 5,405,521 | A * | 4/1995 | Nakamori et al. | 204/425 |
| 5,637,786 | A * | 6/1997 | Weber et al. | 73/23.32 |
| 6,073,083 | A * | 6/2000 | Schnaibel et al. | 702/65 |
| 6,831,471 | B2 * | 12/2004 | Gertiser et al. | 324/693 |
| 7,630,840 | B2 * | 12/2009 | Sell et al. | 702/58 |
| 7,631,537 | B2 * | 12/2009 | Tada et al. | 73/23.21 |
| 7,634,351 | B2 * | 12/2009 | Diem | 701/114 |

* cited by examiner

*Primary Examiner* — Freddie Kirkland, III

(57) ABSTRACT

An oxygen sensor circuit comprises an oxygen sensor, a bias voltage module, and a switch module. The bias voltage module communicates with the oxygen sensor and generates a bias voltage. The switch module selectively connects the bias voltage module to the oxygen sensor.

18 Claims, 5 Drawing Sheets

CLOSED LOOP CONTROL WITH BIAS VOLTAGE TOGGLE

CROSS-REFERENCE TO RELATED APPLICATIONS

This application claims the benefit of U.S. Provisional Application No. 61/140,263, filed on Dec. 23, 2008. The disclosure of the above application is incorporated herein by reference.

FIELD

The present disclosure relates to control of an oxygen sensor input circuit.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a vehicle 100 includes an oxygen sensor 102 that is connected to an engine control module (ECM) 104. The oxygen sensor 102 determines an amount of oxygen in an air/fuel mixture combusted by an engine of the vehicle 100. The oxygen sensor 102 may provide a voltage output that corresponds to the oxygen level. The ECM 104 controls various engine functions based on oxygen level. For example, the ECM 104 measures voltage across a load resistor $R_{Load}$ that is connected to the oxygen sensor 102 and controls the amount of fuel added to the air/fuel mixture based on the measured voltage.

The oxygen sensor 102 may not be "ready" when the vehicle 100 is initially started. For example, the oxygen sensor 102 may not provide reliable measurements when the vehicle 100 is initially started. Accordingly, the ECM 104 may initially ignore measured oxygen levels and instead use predetermined (i.e. stored) data. The ECM 104 may continue to use the predetermined data until the oxygen sensor 102 provides reliable measurements. As such, the vehicle 100 operates in an open loop mode until the oxygen sensor 102 measurements are used.

When the oxygen sensor 102 is ready, the ECM 104 uses the measured oxygen levels and the system operates in a closed loop mode. When the vehicle 100 is operated in the closed loop mode, overall engine operation may be improved. For example, the ECM 104 may adjust how much fuel is added to the air/fuel mixture more accurately based on the measured oxygen levels, decreasing vehicle emissions.

Measurements of the oxygen sensor 102 may be taken across $R_{Load}$. The oxygen sensor 102 may be modeled as a resistor $R_1$ and a voltage source $V_1$. Initially, when the vehicle 100 is started, $R_1$ may be large. $R_1$ may then decrease in resistance as the temperature of the oxygen sensor 102 increases. For example, initially the temperature of the oxygen sensor 102 may be 200° C. and $R_1$ may measure 4 MΩ. As the temperature increases to 700° C., $R_1$ may measure 20Ω.

While $R_1$ changes based on temperature, $V_1$ is determined by the oxygen level of the air/fuel mixture. For example, a voltage of 0.2 volts may correspond to an oxygen level resulting from a low air/fuel ratio, while 0.8 volts may correspond to a high air/fuel ratio. The ECM 104 measures the voltage across $R_{load}$ to determine the oxygen level and thereby regulate the air/fuel mixture.

The oxygen sensor 102 may be diagnosed for faults such as open circuits. A bias voltage module 106 may be included in the system so that diagnostics may be performed. The bias voltage module 106 may include a voltage source $V_2$ and resistor $R_2$ in series. The voltage source $V_2$ is a fixed voltage source. The resistor $R_2$ of the bias voltage module 106 is fixed. For example, $V_2$ may be 1.9 volts and $R_2$ may be 600Ω. $R_{Load}$ may also be a fixed resistor.

SUMMARY

An oxygen sensor circuit comprises an oxygen sensor, a bias voltage module, and a switch module. The bias voltage module communicates with the oxygen sensor and generates a bias voltage. The switch module selectively connects the bias voltage module to the oxygen sensor. In further features, the switch module connects the bias voltage module to the oxygen sensor periodically. In other features, the switch module connects the bias voltage module to the oxygen sensor based on a predetermined period of time from the start of an engine.

In other features, the oxygen sensor circuit further comprises a sensor monitoring module that compares at least one parameter of the oxygen sensor and a predetermined oxygen sensor value, and the switch module connects the bias voltage module to the oxygen sensor based on the comparison. In further features, at least one parameter includes voltage, and the switch module connects the bias voltage module to the oxygen sensor after the voltage is equal to the predetermined oxygen sensor value.

In other features, the comparison includes a predetermined period of time from the start of an engine, and the switch module connects the bias voltage module to the oxygen sensor based on the comparison. In still other features, the switch module connects the bias voltage module to the oxygen sensor continuously based on the comparison. In still other features, the switch module connects the bias voltage module to the oxygen sensor periodically based on the comparison.

An oxygen sensor control method comprises communicating with an oxygen sensor, generating a bias voltage using a bias voltage module, and selectively connecting the bias voltage module to the oxygen sensor. In further features, the oxygen sensor control method further comprises connecting the bias voltage module to the oxygen sensor periodically. In other features, the oxygen sensor control method further comprises connecting the bias voltage module to the oxygen sensor based on a predetermined period of time from the start of an engine.

In still other features, the oxygen sensor control method further comprises comparing at least one parameter of the oxygen sensor and a predetermined oxygen sensor value, and connecting the bias voltage module to the oxygen sensor based on the comparison. In further features, the oxygen sensor control method further comprises connecting the bias voltage module to the oxygen sensor after the predetermined oxygen sensor value is equal to the at least one parameter, wherein the at least one parameter includes voltage.

In other features, the oxygen sensor control method further comprises connecting the bias voltage module to the oxygen sensor based on the comparison, wherein the comparison includes a predetermined period of time from the start of an engine. In other features, the oxygen sensor control method further comprises connecting the bias voltage module to the oxygen sensor continuously based on the comparison. In other features, the oxygen sensor control method further comprises connecting the bias voltage module to the oxygen sensor periodically based on the comparison.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
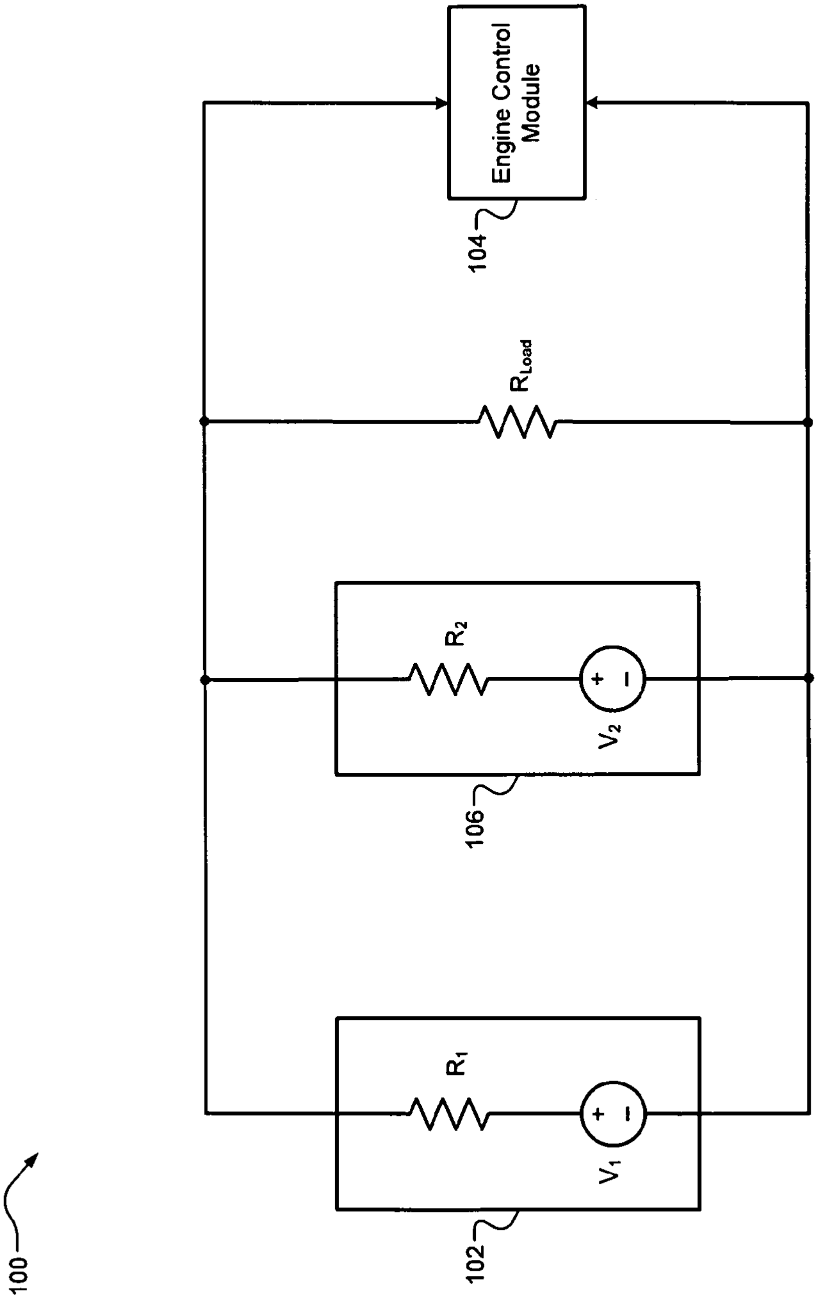
FIG. 1 Prior Art
FIG. 1 is a functional block diagram of an oxygen sensor input circuit according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control module may connect or disconnect a bias voltage module to an oxygen sensor input circuit by using, for example, a switch. The switch may include a controllable switch and connect or disconnect the bias voltage module based on a command from the engine control module. By disconnecting the bias voltage module from the oxygen sensor, a time needed for the oxygen sensor to be considered reliable may decrease. When the bias voltage module is connected, the circuit may be diagnosed for faults including, but not limited to, open circuits.

Figure 2:
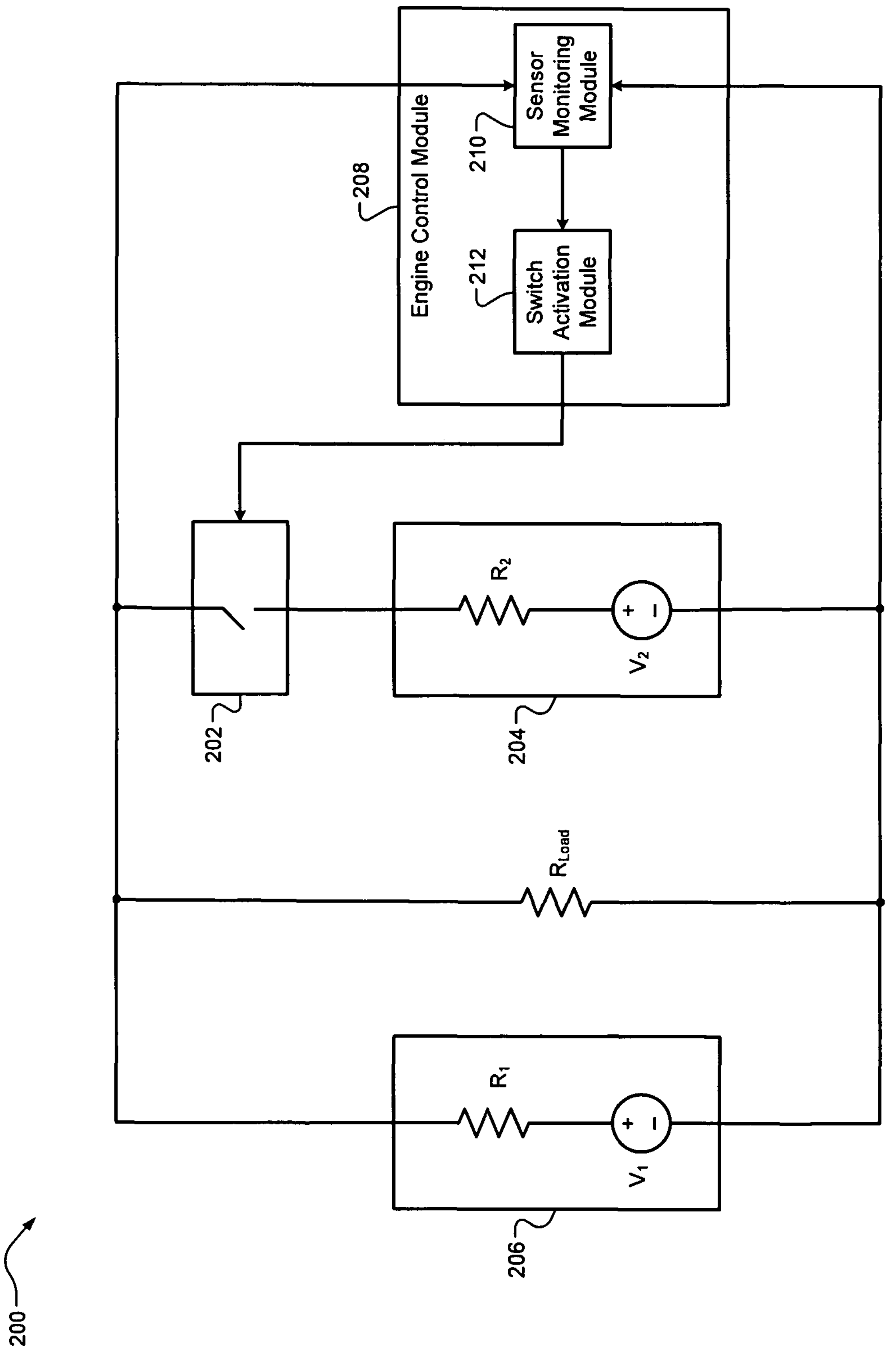
FIG. 2 is a functional block diagram of an exemplary implementation of an oxygen sensor input circuit according to the present disclosure.

Referring now to FIG. 2, a functional block diagram of an exemplary implementation of an oxygen sensor input circuit 200 according to the principles of the present disclosure is presented. A switch module 202 is arranged in series with a bias voltage module 204. The bias voltage module 204 may include a voltage source $V_2$ in series with a resistor $R_2$. The switch module 202 may selectively remove the bias voltage module 204 from the oxygen sensor input circuit 200. For example, the switch module 202 may be a software programmable switch. In various implementations, the switch module 202 may be included in the bias voltage module 204.

An oxygen sensor 206 outputs a voltage based on an oxygen level. The oxygen sensor 206 may include a voltage source $V_1$ and a resistor $R_1$. The output voltage may be measured across a load resistor $R_{Load}$.

An engine control module 208 may include a sensor monitoring module 210. The sensor monitoring module 210 may measure a value across $R_{load}$. The sensor monitoring module 210 compares the measured value to a threshold value. A switch activation module 212 may be triggered based on the comparison. For example, the sensor monitoring module 210 may trigger the switch activation module 212 when the measured value reaches the threshold value. The switch activation module 212 may control the switch module 202.

The switch module 202 may disconnect the bias voltage module 204 when the engine is started. When the bias voltage module 204 is disconnected from the circuit, the bias voltage module 204 does not influence an amount of time required for the oxygen sensor input circuit 200 to operate in a closed loop mode. For example, when the bias voltage module 204 is connected to the oxygen sensor input circuit 200, the voltage across $R_{load}$ is effected by both the bias voltage module 204 and the oxygen sensor 206.

Initially, the voltage output from the oxygen sensor 206 has a minimal effect on the voltage across $R_{load}$. When the oxygen sensor 206 is considered reliable, the bias voltage module 204 has a minimal effect on the voltage across $R_{load}$. Because the oxygen sensor 206 has to compete with the bias voltage module 204, the amount of time required for the oxygen sensor input circuit 200 to operate in the closed loop mode increases.

When the bias voltage module 204 is included in the oxygen sensor input circuit 200, a sample of voltage values across $R_{load}$ may be collected and used for diagnostic purposes. When the oxygen sensor input circuit 200 operates in the closed loop mode, the switch module 202 is closed to include the bias voltage module 204. Samples taken after the switch module 202 is closed may be used for diagnostics.

In various implementations, the switch module 202 may alternate between the closed and open positions. The switch activation module 212 may control the switch module 202 to close the switch at a frequency for a period of time. For example only, the switch may be closed at a frequency of once every 5 seconds for a period of 1 second. During the 1 second period that the switch module 202 is closed, the system may be sampled for diagnostics, while the 4 second period that the switch module 202 is open may be used for closed loop operation. Accordingly, the switch module 202 may allow the system to enter closed loop mode faster and perform diagnostics on the oxygen sensor input circuit 200.

In various implementations, the switch module 202 may remain closed after initiated or may alternate between open and closed positions. The switch activation module 212 may begin controlling the switch module 202 after a threshold period of time after the engine is started. For example, the switch activation module 212 may begin controlling the switch module 202 8 seconds after the engine is started.

In another implementation, the switch activation module 212 may begin controlling the switch module 202 after the threshold period or when triggered. For example, the threshold period may be 10 seconds. The switch activation module 212 may control the switch module 202 at the 10 second mark or when the voltage across $R_{load}$ reaches the threshold, whichever occurs first.

Figure 3:
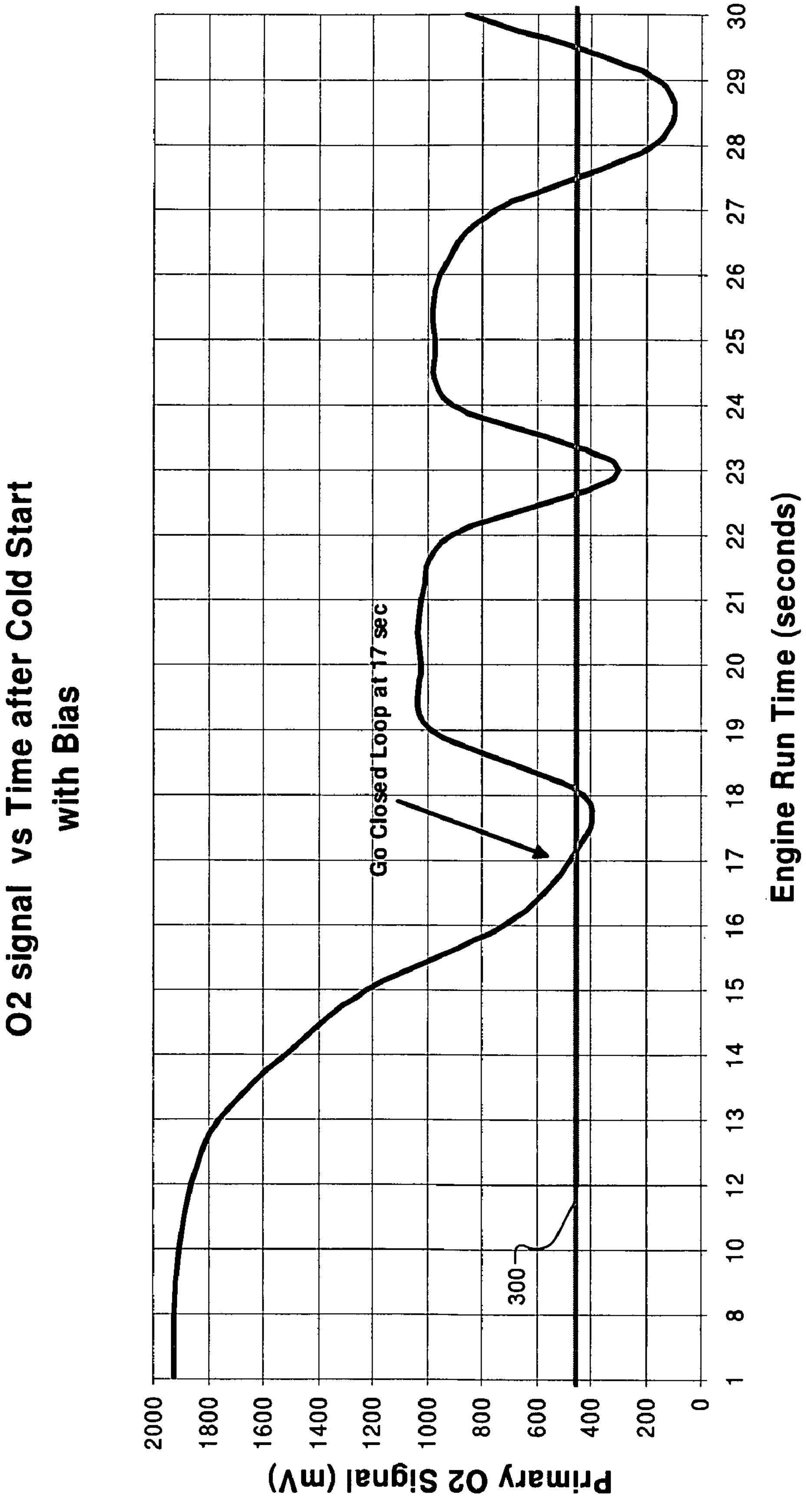
FIG. 3 is a graphical depiction of exemplary oxygen sensor voltage readings vs. engine run time when a bias voltage module is connected according to the present disclosure.

Referring now to FIG. 3, a graphical depiction of exemplary oxygen sensor voltage readings when the bias voltage module 204 is connected to the oxygen sensor input circuit 200 is shown. The measured voltage begins at 1.9 V and decreases as the oxygen sensor 206 warms. The measured voltage begins at 1.9 V because of the exemplary voltage of the bias voltage module 204. The voltage output from the oxygen sensor 206 contends with the voltage output from the bias voltage module 204. As the oxygen sensor 206 warms, the effect of the bias voltage module 204 on the measured voltage decreases.

The oxygen sensor 206 may be considered reliable when the voltage decreases below a threshold, such as 450 mV. Accordingly, 450 mV may be a closed loop switch point 300 (exemplary threshold value) as indicated. The closed loop switch point 300 may determine when the oxygen sensor 206 is ready to provide accurate measurements. When the measured voltage across the load resistor $R_{Load}$ decreases below the closed loop switch point 300 for a first time, the oxygen sensor input circuit 200 may enter the closed loop mode. As shown in FIG. 3, the measured voltage does not decrease below the closed loop switch point 300 until approximately 17 seconds after the engine is started.

Figure 4:
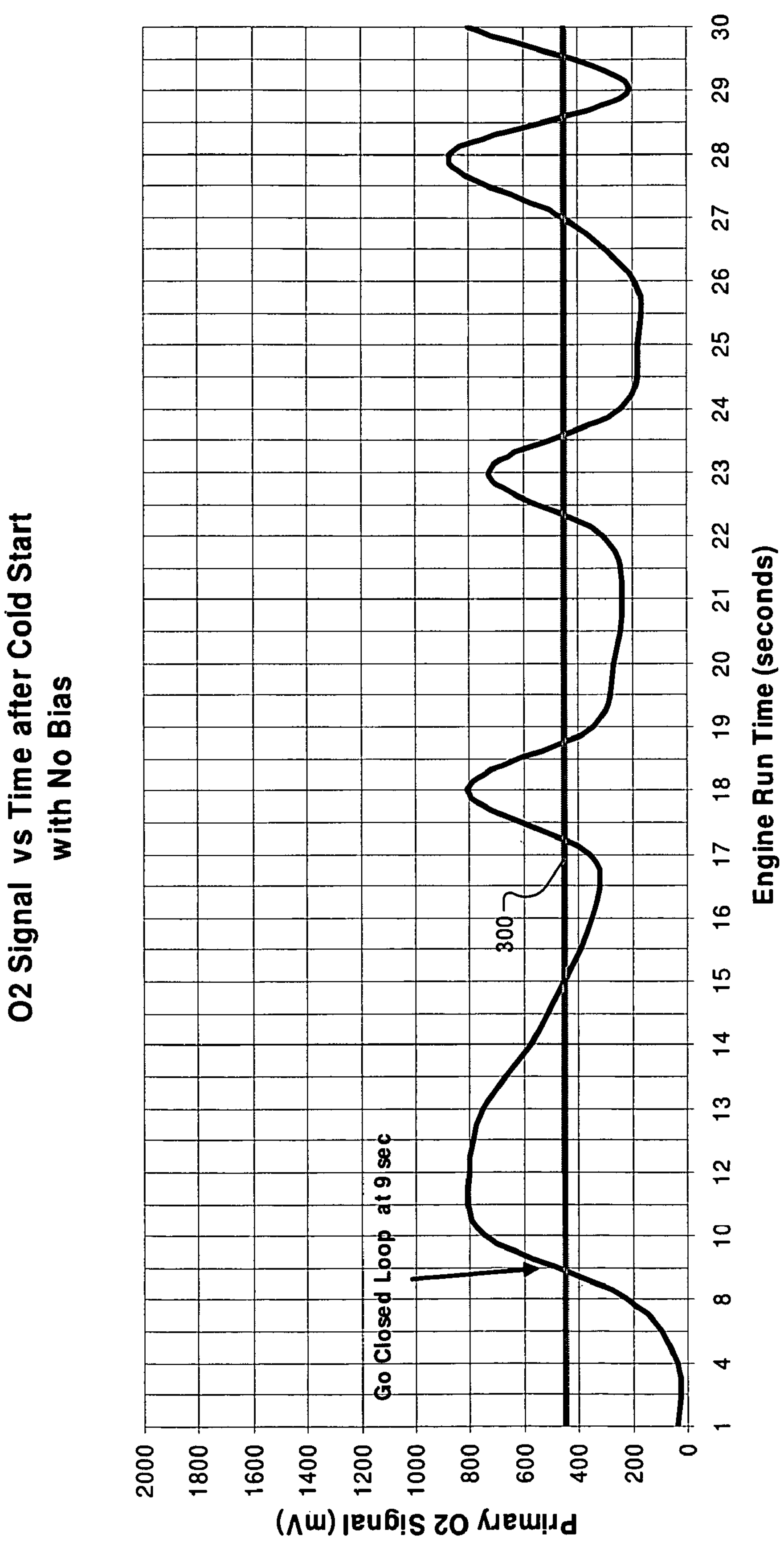
FIG. 4 is a graphical depiction of exemplary oxygen sensor voltage readings vs. engine run time when a bias voltage module is not connected according to the present disclosure.

In FIG. 4, a graphical depiction of exemplary oxygen sensor voltage readings when a bias voltage module 204 is not connected to an oxygen sensor input circuit 200 is shown. A time required for the voltage to increase above the closed loop switch point 300 is approximately 9 seconds. By not including the bias voltage module 204 in the oxygen sensor input circuit 200, the time required to enter the closed loop mode decreases significantly. The measured voltage is not effected by the bias voltage module 204 and is not biased by the 1.9 V output of the bias voltage module 204.

The voltage output from the oxygen sensor 206 does not contend with the voltage output from the bias voltage module 204. Instead, the measured voltage is effected by the voltage output from the oxygen sensor 206. As the oxygen sensor 206 warms, the voltage output from the oxygen sensor 206 increases. Accordingly, the measured voltage begins increasing before the oxygen sensor input circuit 200 enters the closed loop mode. The decrease in time before the oxygen sensor input circuit 200 operates in the closed loop mode decreases vehicle emissions.

Figure 5:
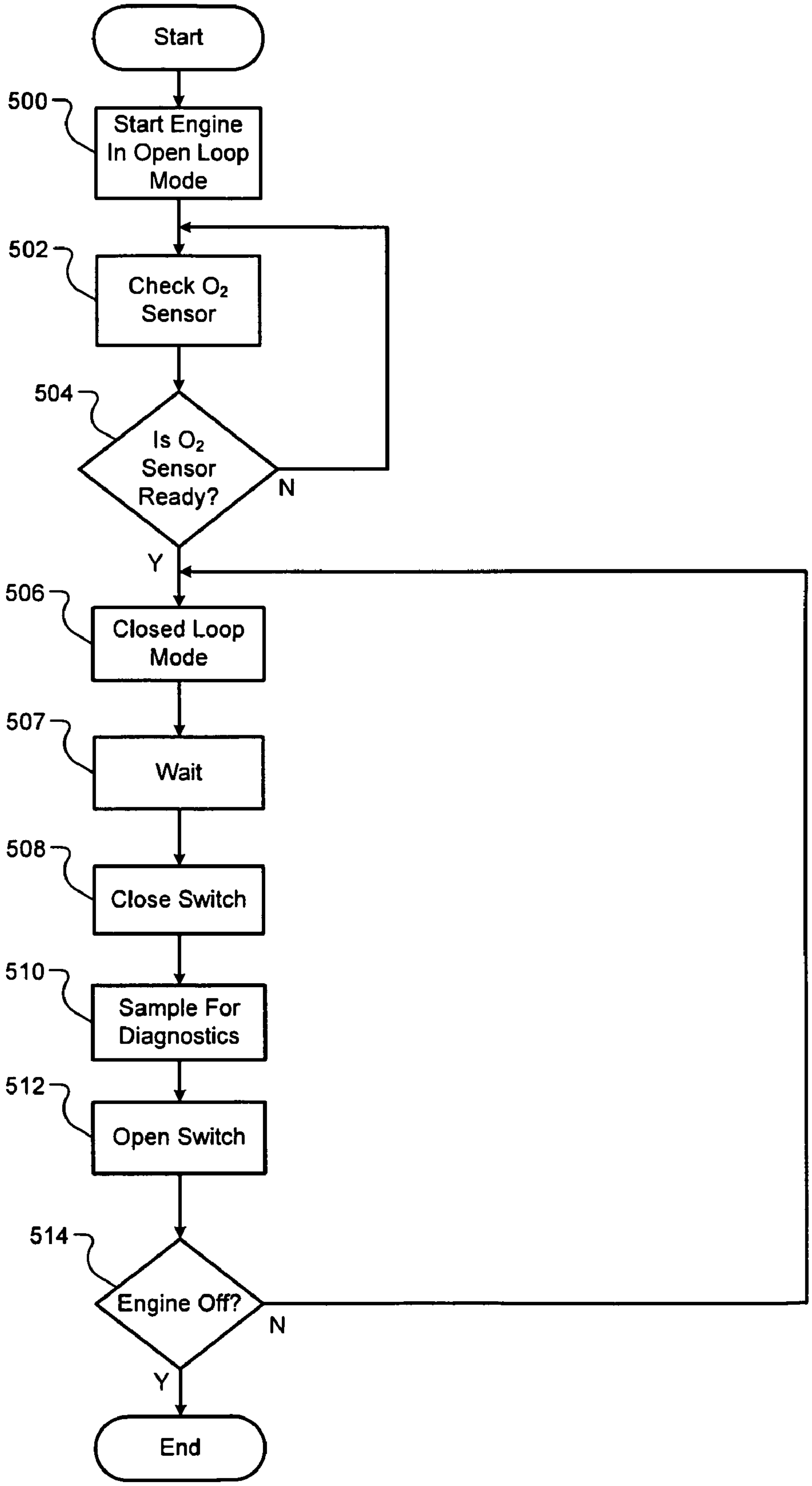
FIG. 5 is a flowchart that depicts exemplary steps in an oxygen sensor control method according to the present disclosure.

Referring now to FIG. 5, a flowchart that depicts exemplary steps in an oxygen sensor control method according to the principles of the present disclosure is presented. In step 500, control starts the engine in the open loop mode (i.e. the ECM 208 controls various engine functions based on predetermined data). In step 502, control monitors the oxygen sensor 206 voltage output. In step 504, control determines whether the oxygen sensor 206 is ready (i.e. the voltage output decreases below the threshold). If the oxygen sensor 206 is not yet ready, control returns to step 502; otherwise, control transfers to step 506.

In step 506, control enters closed loop mode. In step 507, control waits for a period of time, such as four seconds, before closing the switch to connect the bias voltage. In step 508, control connects the bias voltage to the system by closing the switch. In step 510, control samples for diagnostic purposes. For example only, diagnostic sampling may last for one second. In step 512, control opens the switch. Control continues in step 514. In step 514, control checks whether the engine is off. If the engine is shutting down, control ends; otherwise, control returns to step 506.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An oxygen sensor circuit comprising:

an oxygen sensor;

a bias voltage module that generates a bias voltage; and a switch module that disconnects said bias voltage module from said oxygen sensor for a period beginning at startup of an engine and that selectively connects said bias voltage module in parallel with said oxygen sensor after said period.

2. The oxygen sensor circuit of claim 1 wherein said switch module connects said bias voltage module to said oxygen sensor periodically after said period.

3. The oxygen sensor circuit of claim 1 wherein said period is a predetermined period.

4. The oxygen sensor circuit of claim 1 further comprising a sensor monitoring module that compares at least one parameter of said oxygen sensor and a predetermined oxygen sensor value, wherein said switch module connects said bias voltage module to said oxygen sensor based on said comparison.

5. The oxygen sensor circuit of claim 4 wherein said at least one parameter includes voltage, wherein said switch module connects said bias voltage module to said oxygen sensor after said voltage is equal to said predetermined oxygen sensor value.

6. The oxygen sensor circuit of claim 4 wherein said comparison includes a predetermined period of time from the startup of the engine, wherein said switch module connects said bias voltage module to said oxygen sensor based on said comparison.

7. The oxygen sensor circuit of claim 4 wherein said switch module connects said bias voltage module to said oxygen sensor continuously based on said comparison.

8. The oxygen sensor circuit of claim 4 wherein said switch module connects said bias voltage module to said oxygen sensor periodically based on said comparison.

9. An oxygen sensor control method comprising:

communicating with an oxygen sensor;

generating a bias voltage using a bias voltage module;

disconnecting said bias voltage module from said oxygen sensor for a period beginning at startup of an engine; and selectively connecting said bias voltage module in parallel with said oxygen sensor after said period.

10. The oxygen sensor control method of claim 9 further comprising connecting said bias voltage module to said oxygen sensor periodically after said period.

11. The oxygen sensor control method of claim 9 wherein said period is a predetermined period.

12. The oxygen sensor control method of claim 9 further comprising:

comparing at least one parameter of said oxygen sensor and a predetermined oxygen sensor value; and connecting said bias voltage module to said oxygen sensor based on said comparison.

13. The oxygen sensor control method of claim 12 further comprising connecting said bias voltage module to said oxygen sensor after said predetermined oxygen sensor value is equal to said at least one parameter, wherein said at least one parameter includes voltage.

14. The oxygen sensor control method of claim 12 further comprising connecting said bias voltage module to said oxygen sensor based on said comparison, wherein said comparison includes a predetermined period of time from the startup of the engine.

15. The oxygen sensor control method of claim 12 further comprising connecting said bias voltage module to said oxygen sensor continuously based on said comparison.

16. The oxygen sensor control method of claim 12 further comprising connecting said bias voltage module to said oxygen sensor periodically based on said comparison.

17. An oxygen sensor circuit comprising:

an oxygen sensor;

a bias voltage module that communicates with said oxygen sensor and generates a bias voltage;

a switch module that selectively connects said bias voltage module to said oxygen sensor; and a sensor monitoring module that compares at least one parameter of said oxygen sensor and a predetermined oxygen sensor value, wherein said switch module connects said bias voltage module to said oxygen sensor based on said comparison, wherein said at least one parameter includes voltage, and wherein said switch module connects said bias voltage module to said oxygen sensor after said voltage is equal to said predetermined oxygen sensor value.

18. An oxygen sensor control method comprising:

communicating with an oxygen sensor;

generating a bias voltage using a bias voltage module;

selectively connecting said bias voltage module to said oxygen sensor;

comparing at least one parameter of said oxygen sensor and a predetermined oxygen sensor value; and connecting said bias voltage module to said oxygen sensor based on said comparison; and connecting said bias voltage module to said oxygen sensor after said predetermined oxygen sensor value is equal to said at least one parameter, wherein said at least one parameter includes voltage.

* * * * *